(12) United States Patent
Percebon et al.

(10) Patent No.: US 9,889,754 B2
(45) Date of Patent: Feb. 13, 2018

(54) SYSTEM AND METHOD FOR REDUCING LEAKAGE FLUX IN WIRELESS ELECTRIC VEHICLE CHARGING SYSTEMS

(71) Applicant: QUALCOMM Incorporated, San Diego, CA (US)

(72) Inventors: Leandro Percebon, Munich (DE); Michael Werner, Markt Schwaben (DE); Daniel Kuerschner, Grasbrunn (DE); Wojciech Chlebosz, Taufkirchen (DE)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 14/481,804

(22) Filed: Sep. 9, 2014

(65) Prior Publication Data
US 2016/0068069 A1    Mar. 10, 2016

(51) Int. Cl.
*B60L 11/18* (2006.01)
*H01F 27/00* (2006.01)
*H02J 5/00* (2016.01)

(52) U.S. Cl.
CPC ......... *B60L 11/182* (2013.01); *B60L 11/1829* (2013.01); *B60L 11/1833* (2013.01); *H01F 27/00* (2013.01); *H02J 5/005* (2013.01); *B60L 2230/10* (2013.01); *B60L 2270/147* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .................................................... B60L 11/182

USPC ......................................................... 307/104
See application file for complete search history.

(56) References Cited

U.S. PATENT DOCUMENTS

| 7,211,986 | B1 | 5/2007 | Flowerdew et al. |
| 8,203,434 | B2 | 6/2012 | Yoshida |
| 9,071,061 | B2 | 6/2015 | Boys et al. |
| 9,106,083 | B2 | 8/2015 | Partovi |
| 9,627,129 | B2 | 4/2017 | Abe et al. |
| 2002/0041176 | A1 | 4/2002 | Eki |

(Continued)

FOREIGN PATENT DOCUMENTS

| CN | 203942319 U | 11/2014 |
| JP | 2002152901 A | 5/2002 |

(Continued)

OTHER PUBLICATIONS

International Search Report and Written Opinion—PCT/US2015/048973—ISA/EPO—dated Dec. 18, 2015.

*Primary Examiner* — Joseph Chang
(74) *Attorney, Agent, or Firm* — Knobbe, Martens, Olson & Bear, LLP

(57) ABSTRACT

A method and apparatus for reducing leakage magnetic flux in wireless vehicle charging systems are disclosed. A wireless power receiver may be configured to couple to a wireless field generated by a wireless power transmitter. A portion of the wireless field may comprise the leakage magnetic flux. A leakage collector comprising a ferromagnetic material may be positioned at a distance from the wireless power receiver within the wireless field and may be configured to absorb or redirect at least a portion of the leakage magnetic flux away from an outer edge of an electric vehicle.

39 Claims, 12 Drawing Sheets

(56) References Cited

U.S. PATENT DOCUMENTS

| | | |
|---|---|---|
| 2011/0181123 A1 | 7/2011 | Ichikawa |
| 2011/0181238 A1 | 7/2011 | Soar |
| 2012/0146424 A1 | 6/2012 | Urano |
| 2012/0242447 A1* | 9/2012 | Ichikawa ............ B60L 11/182 336/84 C |
| 2013/0015718 A1 | 1/2013 | Jung et al. |
| 2013/0088090 A1 | 4/2013 | Wu et al. |
| 2013/0119928 A1 | 5/2013 | Partovi |
| 2013/0181667 A1 | 7/2013 | Takeshita et al. |
| 2013/0257173 A1 | 10/2013 | Saitoh et al. |
| 2013/0257367 A1 | 10/2013 | Someya |
| 2013/0271069 A1 | 10/2013 | Partovi |
| 2013/0306364 A1 | 11/2013 | Suzuki et al. |
| 2014/0008995 A1 | 1/2014 | Kanno |
| 2014/0042820 A1 | 2/2014 | Park et al. |
| 2014/0132210 A1 | 5/2014 | Partovi |
| 2014/0246958 A1 | 9/2014 | Taniguchi et al. |
| 2014/0265621 A1 | 9/2014 | Wong et al. |
| 2014/0361634 A1 | 12/2014 | Scholz |
| 2015/0077053 A1 | 3/2015 | Stamenic et al. |
| 2015/0162753 A1 | 6/2015 | Werner et al. |
| 2015/0200048 A1 | 7/2015 | Han et al. |
| 2015/0255993 A1 | 9/2015 | Kuerschner et al. |
| 2015/0260835 A1 | 9/2015 | Widmer et al. |
| 2015/0380157 A1 | 12/2015 | Green et al. |
| 2016/0068070 A1 | 3/2016 | Huang et al. |
| 2016/0072296 A1 | 3/2016 | Nejatali et al. |
| 2016/0144727 A1 | 5/2016 | Tokura et al. |
| 2016/0190814 A1 | 6/2016 | Budhia et al. |
| 2016/0303981 A1 | 10/2016 | Neumann et al. |
| 2017/0070075 A1 | 3/2017 | Percebon et al. |

FOREIGN PATENT DOCUMENTS

| | | |
|---|---|---|
| KR | 20130072284 A | 7/2013 |
| KR | 20130098099 A | 9/2013 |
| WO | WO-2012102008 A1 | 8/2012 |
| WO | WO-2013107920 A1 | 7/2013 |
| WO | WO-2014122121 A1 | 8/2014 |
| WO | WO-2014132115 A2 | 9/2014 |

* cited by examiner

SYSTEM AND METHOD FOR REDUCING LEAKAGE FLUX IN WIRELESS ELECTRIC VEHICLE CHARGING SYSTEMS

TECHNOLOGICAL FIELD

The present disclosure relates generally to wireless power transfer, and more specifically to devices, systems, and methods related to wireless power transfer to remote systems such as vehicles including batteries, and in particular to magnetic field distribution optimization for integration of electronic components in inductive power transfer systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless Electric Vehicle Charging (WEVC) systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY

The disclosure provides an apparatus for collecting leakage magnetic flux of a wireless field in a wireless power transfer system. The apparatus comprises a wireless power receiver configured to couple to the wireless field generated by a wireless power transmitter. A portion of the wireless field comprises the leakage magnetic flux. The apparatus further comprises a leakage collector comprising a ferromagnetic material and configured to absorb or redirect at least a portion of the leakage magnetic flux away from an outer edge of an electric vehicle. The leakage collector is positioned at a first distance from the wireless power receiver within the wireless field.

The disclosure provides method for collecting leakage magnetic flux of a wireless field in a wireless power transfer system. The method comprises providing a leakage collector positioned at a first distance from a wireless power receiver within the wireless field. The leakage collector comprises a ferromagnetic material. The method further comprises coupling the leakage collector to the wireless field generated by the wireless power transmitter. A portion of the wireless field comprises the leakage magnetic flux. The method further comprises absorbing or redirecting at least a portion of the leakage magnetic flux away from an outer edge of an electric vehicle.

The disclosure further provides an apparatus for collecting leakage magnetic flux of a wireless field in a wireless power transfer system. The apparatus comprises means for coupling to a wireless field generated by a wireless power transmitter. A portion of the wireless field comprises the leakage magnetic flux. The apparatus further comprises means for absorbing or redirecting at least a portion of the leakage magnetic flux away from an outer edge of an electric vehicle.

Figure 1:
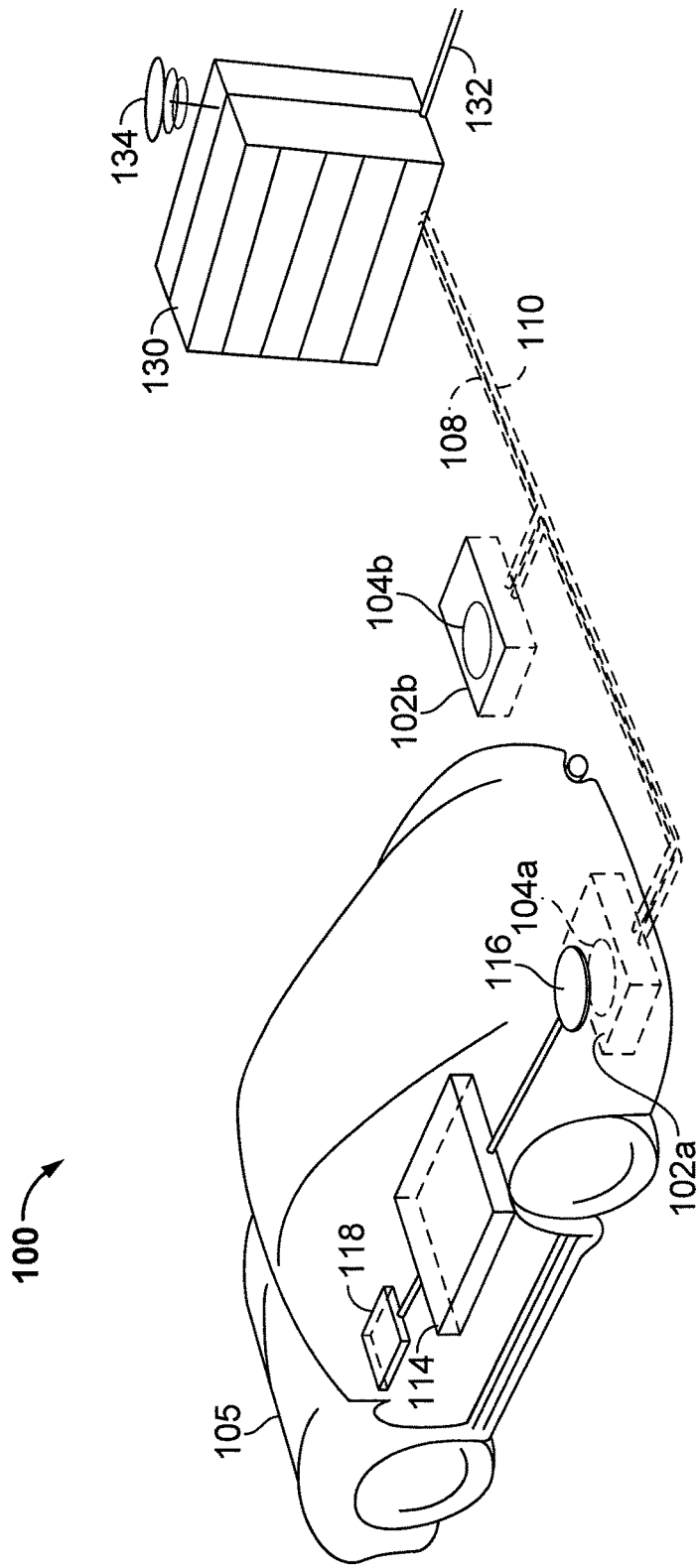
FIG. 1 is a diagram of an exemplary wireless power transfer system for charging an electric vehicle, in accordance with an exemplary implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary implementations and is not intended to represent the only implementations which may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

By way of example and not limitation, a wireless power receiver is described herein in the form of an electric vehicle (EV). Furthermore, other remote systems that may be at least partially powered using a chargeable energy storage device are also contemplated (e.g., electronic devices such as mobile or personal computing devices and the like).

FIG. 1 is a diagram of an exemplary wireless power transfer system for charging an electric vehicle, in accordance with an exemplary implementation. A wireless power transfer system 100 enables charging of an electric vehicle 105 while the electric vehicle 105 is parked near a base wireless charging system 102a.

The electric vehicle 105 is used herein to describe a wireless power receiver. The vehicle 105 utilizes, as part of its locomotion capabilities, electrical power derived from a chargeable energy storage device (e.g., one or more rechargeable electrochemical cells or other type of battery). As non-limiting examples, some electric vehicles like the vehicle 105 may be hybrid electric vehicles that include besides electric motors, a traditional combustion engine for direct locomotion or to charge the vehicle's battery. In an implementation, the electric vehicle 105 may draw all locomotion ability from electrical power. Accordingly, the electric vehicle 105 is not limited to an automobile, as shown, and may include motorcycles, carts, scooters, and the like.

As shown, spaces for two electric vehicles are illustrated in a parking area to be parked over corresponding base wireless charging system 102a and 102b. In some implementations, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. The electric vehicle 105 may include a battery unit 114, an electric vehicle charging induction coil 116, and an electric vehicle wireless charging system 118. The electric vehicle charging induction coil 116 may interact with the base system induction coil 104a for example, via a region of the electromagnetic field generated by the base system induction coil 104a. In certain implementations, the electric vehicle charging induction coil can be disposed within a volume of an electric vehicle charging induction coil housing (not illustrated in FIG. 1).

In some exemplary implementations, the electric vehicle charging induction coil 116 may receive power when the electric vehicle charging induction coil 116 is located in an energy field produced by the base system induction coil 104a. The field corresponds to a region where energy output by the base system induction coil 104a may be captured by an electric vehicle charging induction coil 116. For example, the energy output by the base system induction coil 104a may be at a level sufficient to charge or power the electric vehicle 105. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle charging induction coil 116).

Local distribution center 130 may be configured to communicate with external sources (e.g., a power grid) via a communication backhaul 134, and with the base wireless charging system 102a via a communication link 168.

In some implementations the electric vehicle charging induction coil 116 may be aligned with the base system induction coil 104a and, therefore, disposed within a near-field region simply by the driver positioning the electric vehicle 105 correctly relative to the base system induction coil 104a. In other implementations, a sensor circuit or a controller (described with respect to FIG. 2) may provide a driver with visual feedback, auditory feedback, or combinations thereof to indicate when the electric vehicle 105 is properly placed for wireless power transfer. In some implementations, an autopilot system (not shown in this figure) may move the electric vehicle 105 back and forth as required (e.g., in zig-zag movements) until an alignment error has reached a tolerable value. This function may be performed automatically and autonomously by the electric vehicle 105 without or with only minimal driver intervention provided that the electric vehicle 105 is equipped with a servo steering wheel, ultrasonic sensors, and intelligence to adjust the vehicle. In some implementations, the electric vehicle charging induction coil 116, the base system induction coil 104a, or a combination thereof may have functionality for displacing and moving the induction coils 116 and 104a relative to each other to more accurately orient them and develop more efficient magnetic coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. Wireless power transfer systems may also eliminate exposed electrical contacts and moving parts minimizing (or eliminating) mechanical breakdown, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 105 may be used as distributed storage devices to stabilize a power grid, a docking-to-grid solution may be used to increase availability of vehicles for Vehicle-to-Grid (V2G) operation.

The wireless power transfer system 100 as described with reference to FIG. 1 may also provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 105 and the electric vehicle 105 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
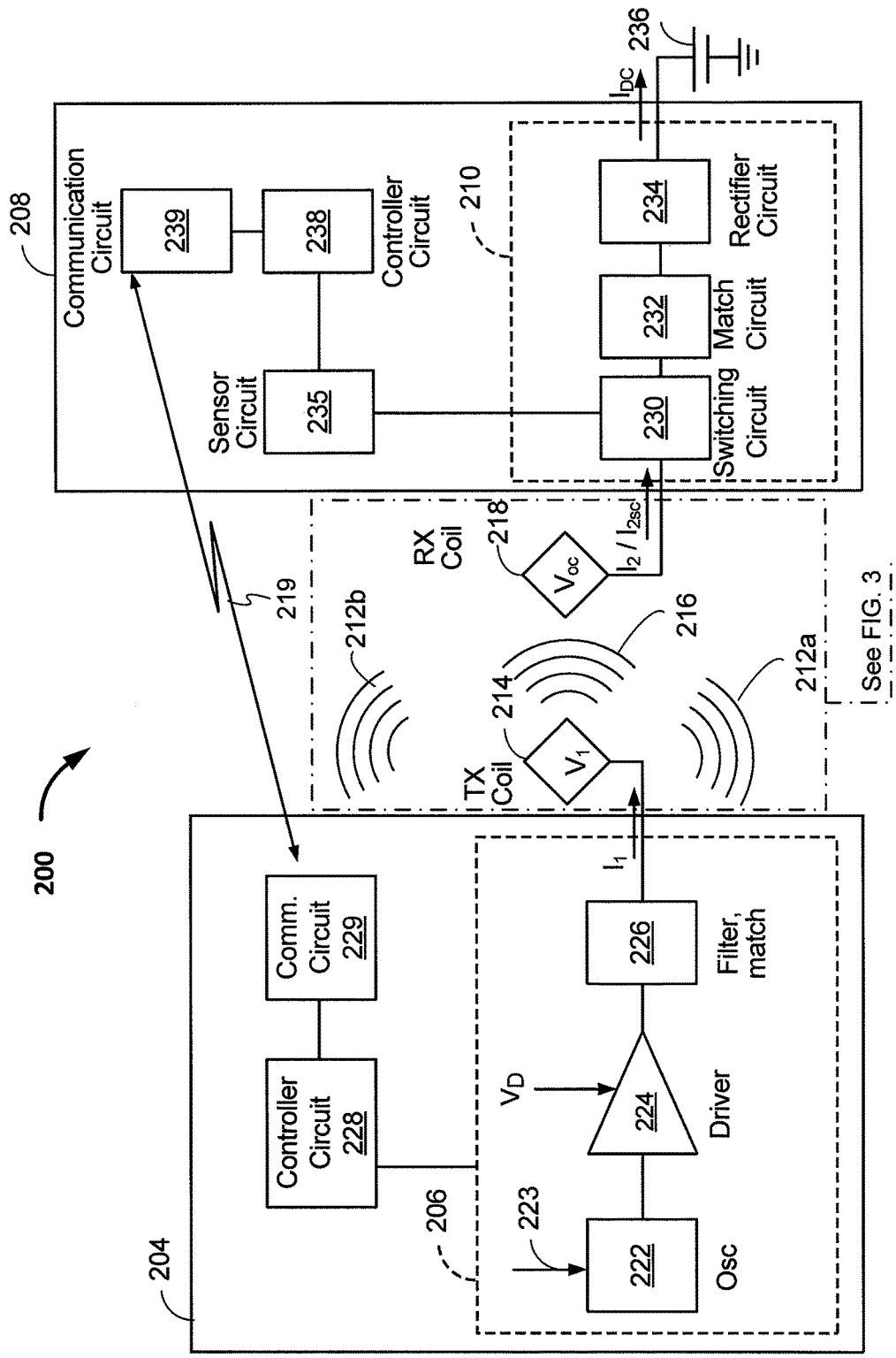
FIG. 2 is a functional block diagram of a wireless power transfer system, in accordance with an exemplary implementation.

FIG. 2 is a functional block diagram of a wireless power transfer system, in accordance with an exemplary implementation. The system 200 includes a transmitter 204 and a receiver 208. The transmitter 204 may perform substantially similar functions to the base wireless charging system 102a. Further, the receiver 208 may perform substantially similar functions as the electric vehicle charging system 114 and the electric vehicle charging induction coil 116 of FIG. 1.

As shown in FIG. 2, the transmitter 204 may include a communication circuit 229 electrically connected to a transmit circuitry 206. The transmit circuitry 206 may include an oscillator 222, operationally coupled to a driver circuit 224 and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. In one non-limiting example, the driver circuit 224 may be a switching amplifier configured to receive a square wave from the oscillator 222 and output a sine wave.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 216 to wirelessly output power at a level sufficient for charging a battery 236 of an electric vehicle, for example.

The transmitter 204 may further include a controller circuit 228 electrically connected to the communication circuit 229. The communication circuit 229 may be configured to communicate with the communication circuit 239 within the receiver 208 over a communications link 219. Communications from the transmitter 204 to the receiver 208 via communications link 219 may comprise information regarding charging processes, including increased or decreased power capabilities of the transmitter 204 and other information associated with the charging capabilities of the transmitter 204. Unless stated otherwise, each component within the transmit circuitry 206 may have substantially the same functionality as the respective components within any complementary transmit circuitry within the base wireless charging system 102 as previously described in connection with FIG. 1.

The receiver 208 may comprise a receive coil 218 and a receive circuitry 210, similar to the electric vehicle charging coil 116 and electric vehicle charging system 118 of FIG. 1. The receive circuitry 210 may include a switching circuit 230 operationally connected to a match circuit 232, and a rectifier circuit 234 operationally connected to the match circuit 232. The receive coil 218 may be electrically connected to the switching circuit 230. The switching circuit may selectively connect the receive coil 218 to the match circuit 232 or short circuit terminals of the receive coil 218 together. The match circuit 232 may be electrically connected to the rectifier circuit 234. The rectifier circuit 234 may provide a DC current to a battery 236. Unless stated otherwise, each component within the receive circuitry 210 may have substantially the same functionality as the respective components within any complementary receive circuitry within electric vehicle charging system 114 as previously described in connection with FIG. 1.

The receiver 208 may further include a sensor circuit 235 configured to sense a short circuit current or an open circuit voltage of the receive coil 218. A controller circuit 238 may be electrically connected to, and receive sensor data from, the sensor circuit 235. A communication circuit 239 may be connected to the controller circuit 238. The communication circuit 239 may be configured to communicate with the communication circuit 229 within the transmitter 204 over the communications link 219, similar to those noted above. Such communications may serve to indicate to the transmitter 204 specific power demands of the receiver 208, charge state of the battery 236, or other information related to the power requirements of the receiver 208.

To provide power from the transmitter 204 to the receiver 208, energy may be transmitted from the transmit coil 214 through a wireless field (e.g., a magnetic or electromagnetic field) 216 to the receive coil 218. The transmit coil 214 and the transmit circuitry 206 form a resonant circuit having a particular resonant frequency. The receive coil 218 and the receive circuitry 210 form another resonant circuit having a particular resonant frequency. Because electromagnetic losses are minimized between two coupled resonant systems having the same resonant frequency, it is desirable for the resonant frequency associated with the receive coil 218 to be substantially the same as the resonant frequency associated with the transmit coil 214. Thus, it is further desirable that the tuning topology for one or both of the transmit coil 214 and the receive coil 218 is not significantly affected by inductance or load changes. The embodiments disclosed herein may incorporate resonant or non-resonant architectures.

According to the above description, the controller circuit 238 may determine the maximum possible output current or voltage for any position of the receive coil 218 with respect to the transmit coil 214. The controller circuit 238 may make such a determination before supplying current to the battery 236. In another implementation, the controller circuit 238 may make such a determination during charging of the battery 236. Such an implementation may provide a safety mechanism to ensure charging current and/or voltage remain within safe limits during the charging cycle. In yet another implementation the controller circuit 238 may make such a determination while a driver is driving the vehicle 105 (FIG. 1) into a space for charging.

As noted above, a matched transmit coil 214 and receive coil 218 of the WEVC system 200 may minimize electromagnetic losses, however some loss remains in the form of leakage fields 212a, 212b (collectively "leakage fields" 212). The movement energy or power through the wireless field 216 (e.g., a magnetic field), or the flux generated by the transmit coil 214 does not typically travel in a straight line to the receive coil 218. Instead, the wireless field 216 lines may emanate in some or all directions, away from the transmit coil 214 affected by the composition of any surrounding structures (e.g., the ground or the bottom of the electric vehicle 105). Accordingly, not all of the transmitted power actually arrives at the receive coil 218. Some of the transmitted magnetic energy (flux) flows in sub-optimum directions, "leaking" out of the system, becoming "leakage flux," or creating the leakage fields 212. The leakage fields 212 may potentially have negative influence on surrounding electronics or creating a safety hazard for people nearby.

Accordingly, it may be advantageous to minimize the leakage magnetic field 212 surrounding the transmit coil 214 and the receive coil 218.

Figure 3:
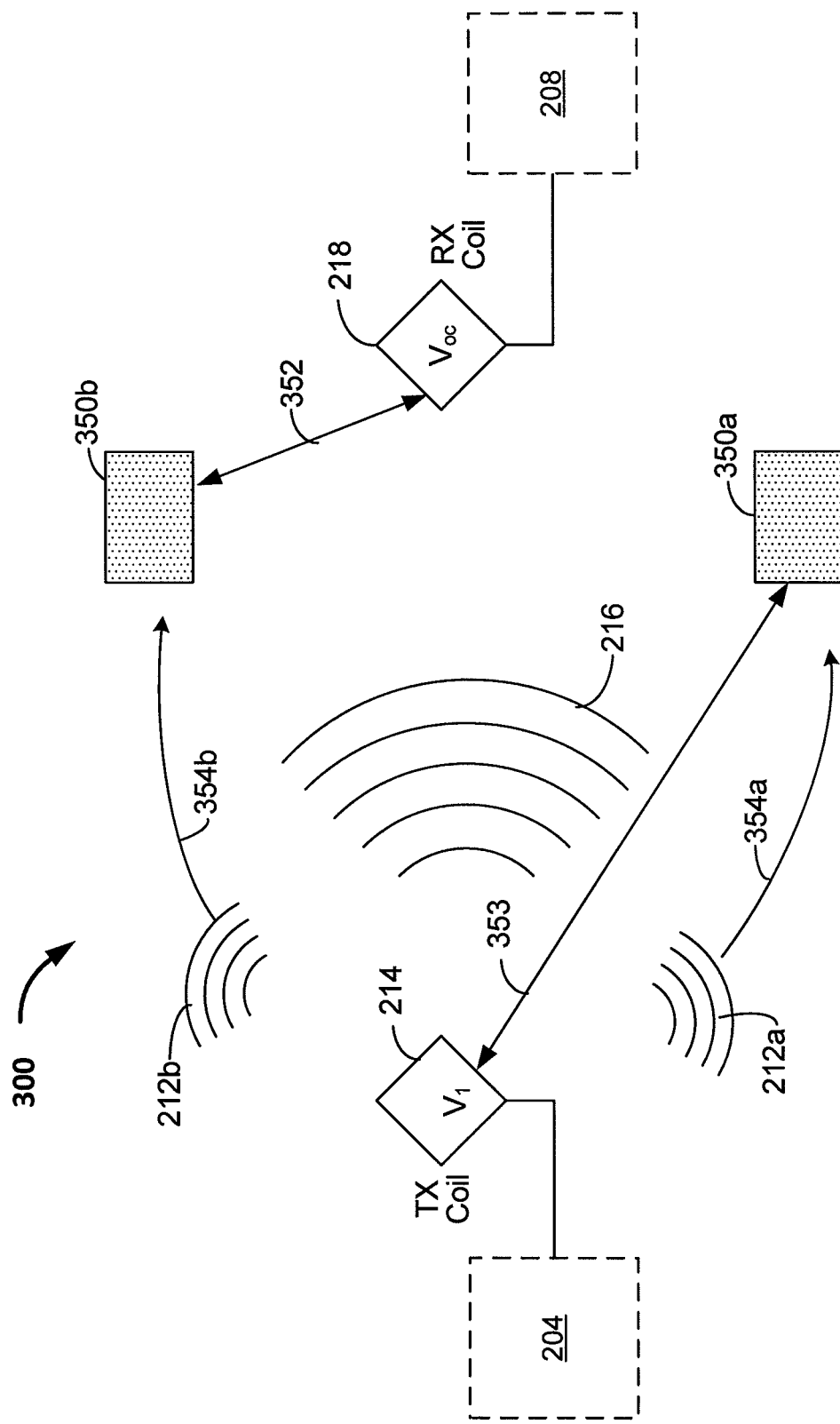
FIG. 3 is a functional block diagram of a wireless power transfer system having leakage field collectors, in accordance with an exemplary implementation.

FIG. 3 is a functional block diagram of a wireless power transfer system having leakage field collectors, in accordance with an exemplary implementation. A WEVC system 300 is shown having the transmit coil 214 and the receive coil 218 substantially similar to those shown in FIG. 2. As shown, the transmit coil 214 may transmit the wireless field 216 in the direction of the receive coil 218. The portions of the wireless field 216 received by the receive coil 218 may be converted into electrical power for the WEVC system 200 as described above, however not all of the energy of the wireless field 216 is actually received by the receive coil 218. The wireless field 216 energy (flux) that is not used to transfer power to the receive coil 218 may be referred to as the leakage field 212, shown flowing in less than optimum directions away from the transmit coil 214 toward the top and bottom of the page as the leakage field 212a and the leakage field 212b. This leakage flux may be detrimental to surrounding electronics or people.

In an implementation, one or more leakage field collectors 350a and 350b (collectively "collectors" 350) may be positioned to redirect and/or absorb the respective stray leakage magnetic fields 212a, 212b. The leakage field collectors 350 may be located at a distance 352 from the receive coil 218 or a distance 353 from the transmit coil 214. The collectors 350 may comprise certain ferrite or other ferromagnetic or ferrimagnetic composites such as soft magnetic composites (SMC), nanocrystalline magnetic materials, or plastic bonded ferrite powder among other materials. Certain ferrous materials such as iron oxides, nickel compositions, among others may also be implemented. Composition, placement, and geometry of the collectors 350 may be selected to allow the collectors 350 to redirect and absorb the leakage magnetic fields 212. In another implementation, the collectors 350 may be further configured to oppose or negate the leakage magnetic fields 212.

Certain WEVC systems 100, 200, 300 may exhibit magnetic fields (e.g. the field 216, the leakage field 212) of varying strengths and patterns. Accordingly, selection and composition of the collectors 350 may depend on characteristics of a power transmitter and power receiver pair (e.g., the transmitter 214 and the receiver 218) paid. In at least one implementation the collector 350 composition, geometry, and position may consider the position and size of the transmitter/receiver pair. Such a consideration may further include the magnitude and location of the leakage field 212 surrounding the electric vehicle 105.

Similarly, electric vehicles 105 may have various physical dimensions and construction. Thus the electric vehicles 105 may have varying characteristics related to the leakage magnetic field 212. Accordingly, selection or construction of the collectors 350 may consider a wide variety of physical characteristics of both the vehicle 105 and the collectors 350. In at least one implementation, the collectors 350 may be selected or formed based on a specific leakage field 212 type and strength. The selection of the collectors 350 may therefore consider that certain leakage fields 212 may be stronger than others or have irregular flux patterns. Such a selection may further consider the presence of people in the vicinity of the vehicle 105 forming or shaping the leakage field 212 as needed.

In another implementation, selection of the collectors 350 may further consider position in relation to the receiver/transmitter, a height of the receiver 218 above the ground and above the transmitter 214 (not shown in this figure).

In addition to considering the above receiver/transmitter and vehicle 105 characteristics, the collectors 350 may take various shapes, sizes and be placed in various positions. The collectors may further have various cross sectional dimensions or three dimensional geometries. The collectors 350 may be formed in a specific shape or geometry (e.g., rectangular, square, curved, straight, segmented, etc.) to take advantage of the effect of a particular shape on the given leakage flux 212 pattern.

The collectors 350 may further be placed in a position that most effectively takes advantage of the selected shape and/or composition. For example, the collectors may be disposed a specific distance from the receiver 218 providing a certain amount of free space between the receiver 218 and the collectors 350. The collectors may be placed at the front, rear, or the sides of the vehicle 105 (see FIG. 5A-FIG. 5I).

The orientation of the collectors 350 may further be considered. Certain leakage field 212 flux patterns may react differently to a collector 350 positions in parallel to the lines of flux versus collectors 350 placed orthogonal to them.

The collectors 350 may further be selected in varying quantities. For example, a segmented collector 350 (see the collectors 545a, 545b of FIG. 5I) may take advantage of the multiple smaller segments to shape the leakage field 212. The smaller segments of such an implementation may also reduce the volume of material used in the collectors 350.

In an implementation, the collectors 350 may be formed in one or more of a variety of possible geometries and placements, as discussed in FIG. 5A-FIG. 6D. As shown in FIG. 3, the two collectors 350 are positioned within range of the wireless field 216, nearest to and flanking the receive coil 218. In an implementation of the WEVC system 300, the receive coil 218 may be disposed on or in the bottom of an electric vehicle 105 (FIG. 1) similar to the electric vehicle charging induction coil 116. Accordingly, the collectors 350 may also be disposed on the bottom of the car, in proximity to the receive coil 218. The positioning, distance from the transmit/receive coils, and geometry of the collectors 350 may affect the ability of the collectors 350 to redirect or absorb the leakage fields 312. The geometry and distance between transmit coil 314 or the receive coil 318 and the collectors 350 is further described below with respect to FIG. 4 and FIG. 5A-FIG. 5I.

In an implementation, the collectors 350 may comprise low-reluctance ferromagnetic materials having a predetermined geometry and composition selected to most effectively direct, capture, collect, or "absorb" the leakage magnetic field 212 to reduce field emissions on the electric vehicle and the surroundings. The collectors 350 may comprise certain ferrite compositions or other ferromagnetic materials. As used herein, magnetic reluctance may be a scalar, expressed in terms of inverse henry ($H^{-1}$). In general, air and vacuum have high reluctance while easily magnetized materials such as iron and most ferrous materials may have low reluctance.

Reluctance may be considered to have an inverse relationship with magnetic permeability: $R=1/(\mu A)$, where R is the scalar representing reluctance; l is the length of the magnetic circuit in meters; $\mu$ is the permeability of the material (dimensionless); and A is the cross sectional area in meters. Thus low reluctance materials are also considered to have "high magnetic permeability."

As used herein, initial magnetic "permeability" generally refers to a measure of the ability of a material to support the formation of a magnetic field within itself (e.g., the collectors 350). Permeability is typically indicated by the constant, "$\mu$," or relative magnetic permeability, "$\mu_r$." As used herein, relative permeability, generally refers to the ratio of the permeability of a specific medium to the permeability of free space (a vacuum), $\mu_0$ ($\mu_r=\mu/\mu_0$). As a non-limiting example, ferrite may be said to have a relative magnetic permeability of $\mu_r=2000$; SMC: $\mu_r=500$; nanocrystalline magnetic material: $\mu_r=1000$; and plastic bonded ferrite powder: $\mu_r=30$. As a point of reference, iron (Fe) is commonly held to have a relative permeability of $\mu_r=5000$. The foregoing examples are provided as reference, as the magnetic permeability of many ferrous/ferromagnetic/ferrimagnetic materials may vary greatly with magnetic field strength (H). For example, the relative permeability of any material in the presence of a sufficiently high field strength may trend toward one (1).

Considering the foregoing, a magnetic field causes magnetic flux to follow the path of least magnetic reluctance through a material having high relative permeability. Accordingly, the low reluctance characteristics of the ferromagnetic collectors 350 may provide a path of least magnetic resistance for the leakage magnetic flux. Thus the collectors 350 may be used to influence the path of the magnetic flux, specifically the leakage fields 350, toward the collectors 350, thereby reducing magnetic field intensity in the vicinity of the receiver 208.

In an implementation, the low reluctance materials of the collectors 350 placed in proximity to the receive coil 218 may attract magnetic flux, drawing the leakage field 212a in direction 356a and the leakage field 212b in direction 356b toward the collectors 350, as opposed to outward toward external systems and people. Accordingly, the collectors 350 may absorb and influence leakage magnetic flux, and may not opposed or cancel the leakage magnetic fields.

Figure 4:
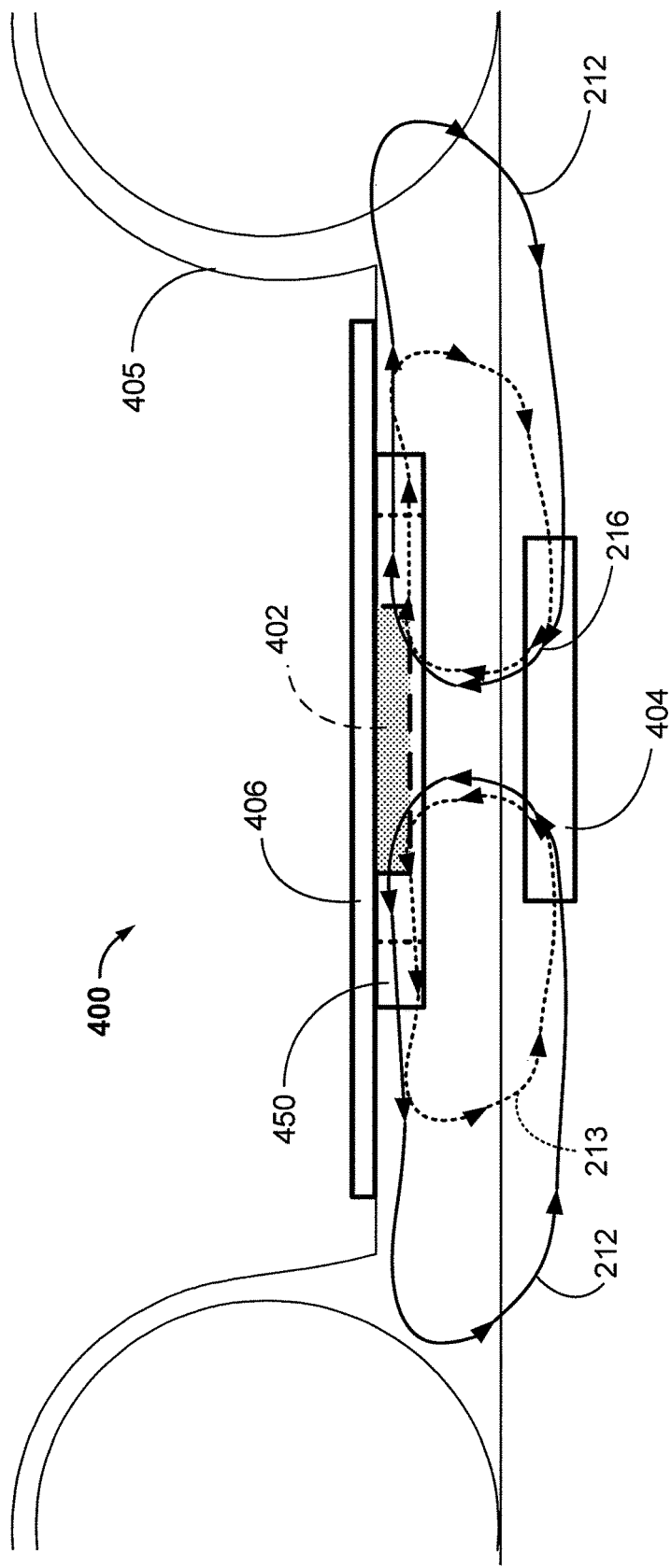
FIG. 4 illustrates an electric vehicle charging induction coil housing and leakage field collectors along a lower surface of an electric vehicle, in accordance with an exemplary implementation.

FIG. 4 illustrates an electric vehicle charging induction coil housing and leakage field collectors along a lower surface of an electric vehicle, in accordance with an exemplary implementation. The wireless power transfer system 100 (FIG. 1) may be used with a variety of electric vehicles 105 compatible with the wireless power transfer system 100 of FIG. 1.

As shown in FIG. 4, an electric vehicle 405, similar to the electric vehicle 105, is receiving wireless power from a WEVC system 400. The system 400 may be substantially similar to the system 100 and be configured to supply the vehicle 405 with wireless power. The electric vehicle 405 may comprise a vehicle shield 406 disposed on the bottom of the vehicle 405 positioned between the wheels. In an implementation, the vehicle shield 406 may cover an extensive portion of the underside of the car and may comprise a structural portion of the vehicle 405. In certain implementations where the vehicle shield comprises a structural portion of the vehicle 405, a separate vehicle shield 406 may not be present. Accordingly, the presence of a specific component referred to as the "vehicle shield 406" in FIG. 4 and in FIG. 5A-FIG. 6D may not be present in some implementations. The vehicle shield 406 and other subsequent implementations may, in certain implementations, be illustrative of the magnetic shielding characteristics of the vehicle 405 itself or the chassis as noted below in connection with FIG. 6A-FIG. 6D. The vehicle shield 406 may also be referred to as a magnetic vehicle shield 406.

The vehicle shield 406 may comprise electromagnetic shielding materials or components. As a non-limiting example, such shielding materials may include certain metallic meshes or solid metal materials configured to negate any incident magnetic energy or otherwise block or prevent such magnetic energy from entering the passenger compartment of the vehicle 405. The vehicle shield 406 may serve to magnetically shield the interior of the vehicle from the wireless field 216 while not interfering with the functions of the wireless power receiver within the housing 402.

The vehicle 405 may further comprise a housing 402 (shown in dashed lines). As shown, the housing 402 may be disposed or otherwise connected to the bottom of the vehicle shield 406. As shown, the housing 402 is located approximately midway between the front and rear wheels. In an implementation, the housing 402 may be located anywhere on the vehicle. In some implementations, it may be useful for the housing 402 to be integrated flush (not shown in this figure) with the lower surface of the electric vehicle 405 so that there are no protrusive parts and so that the specified ground-to-vehicle body clearance may be maintained.

In some implementations the housing 402 may contain at least wireless vehicle charging components, such as wireless power receiver (e.g., the receiver 208 of FIG. 2), and a receiver coil (e.g., the receiver coil 218). The housing 402 may contain all of the components necessary to couple with and receive wireless power from a wireless power transmitter (e.g., the transmitter 204).

The vehicle 405 is positioned over a transmitter 404 (similar to the transmitter 204 of FIG. 2). The transmitter 404 is shown emitting the wireless field 216 (FIG. 2). The housing 402 may receive wireless power from the wireless field 216 as shown. The wireless field 216 is shown in this figure as a series of continuous arrows flowing from the wireless power transmitter 404 to the housing 402. The continuous arrows may be generally representative of the circular or continuous flow of magnetic flux within a magnetic field.

As shown, a portion of the wireless field 216 is shown flowing away from the housing 402. While the majority of the continuous arrows comprising the wireless field 216 are shown in the vicinity of the housing 402, a portion of the arrows are also flowing horizontally away from the power transmitter 404 to the left and right of FIG. 4, representing the front and rear of the vehicle 405. The portion of arrows flowing in sub-optimal directions or away from the housing 402 depict the leakage field 212, similar to that shown in FIG. 2. As noted previously with respect to FIG. 2, the leakage field 212 may have negative effects on nearby electronics or possibly present a hazard to people. While not directly represented in this figure, the leakage field 212 of FIG. 4 also flows to the left and right of the vehicle 405 that is in and out of the page. This is more directly represented below in FIG. 7A and FIG. 7B.

The vehicle 405 may further comprise one or more leakage field collectors 450. The collector 450 may be structurally similar to the collectors 350 (FIG. 3) and may serve to absorb or redirect the leakage magnetic field 212. The leakage field collector 450 is shown positioned in proximity to the housing 402, protruding or extending downward from the bottom of the electric vehicle 405 and surrounding the housing 402. The collector 450 may further be disposed or otherwise mounted to the vehicle shield 406 on the underside of the vehicle 405. The housing 402 is shown in dashed lines, indicating its position behind and/or within a leakage field collector 450 and below a vehicle shield 406. The vertical dotted lines near the front and rear edges of the collector 450 indicate a central aperture or opening (discussed with respect to FIG. 5A-FIG. 5I) allowing the wireless field 212 to easily flow through the center of the collector 450 to be received at the housing 402.

As shown, the collector 450 may protrude away from the bottom of the vehicle 405 a greater distance than the housing 402. As noted above, the housing 402 may be integrated into the bottom of the vehicle 405 such that it is flush with the bottom of the vehicle 405. However, in some implementations, the collector 450 may not protrude from the vehicle 450 than the housing 402. Accordingly, in such an implementation, the lower portion of the housing 402 may protrude from the bottom of the vehicle 405 further than the collector 450 (not shown in this figure).

In some implementations, the leakage field collector 450 may offer a manner to reduce the leakage field 212 by providing a low-reluctance path for the leakage field 212. As shown in FIG. 4, the continuous dotted lines 213 indicate the path of the reduced leakage magnetic field 212 as influenced by the collector 450. The field lines of leakage field 212 may be induced to, flow toward the collector 450 due to presence of the low-reluctance qualities of the collector 450.

FIG. 5A-FIG. 5I depict views of the underside of the vehicle 405 in a substantially horizontal plane along the lower surface of the vehicle 405 (FIG. 4). As shown in FIG. 5A-FIG. 5I, the underside of the vehicle 405 may comprise the vehicle shield 406 disposed along the underside of the vehicle 405. The housing 402 (FIG. 4) may be disposed in a variety positions incident with the vehicle 405 and the vehicle shield 406. The vehicle 405 may further comprise leakage collectors similar to the collector 450 (FIG. 4). The leakage collectors may be positioned a distance away from the housing 402 and near the outer edges of the vehicle 405 as described below, but still within the wireless field 216. Such a distance may vary from a few inches from the housing 402 to the very outer edges of the vehicle 405. The distance may further be measured in comparison to the separation (distance) between the wireless power receiver, or the housing 402 and the outer edge of the electric vehicle 405. For example, the collectors described in connection with FIG. 5A-FIG. 5I may be placed at a position that is one third or at one half or more of the distance from the housing 402 to the outer edge of the vehicle 405. Such a separation may not be uniform around the housing 402. Furthermore, various geometries, shapes (e.g., a line, a square, a rectangle, a circle, a triangle, a polygon, or a semicircle), and other characteristics are shown in FIG. 5A-FIG. 5H. Different aspects of the designs disclosed below may be mixed and matched to suit different applications to efficiently influence or absorb the leakage fields 212.

Figure 5A:
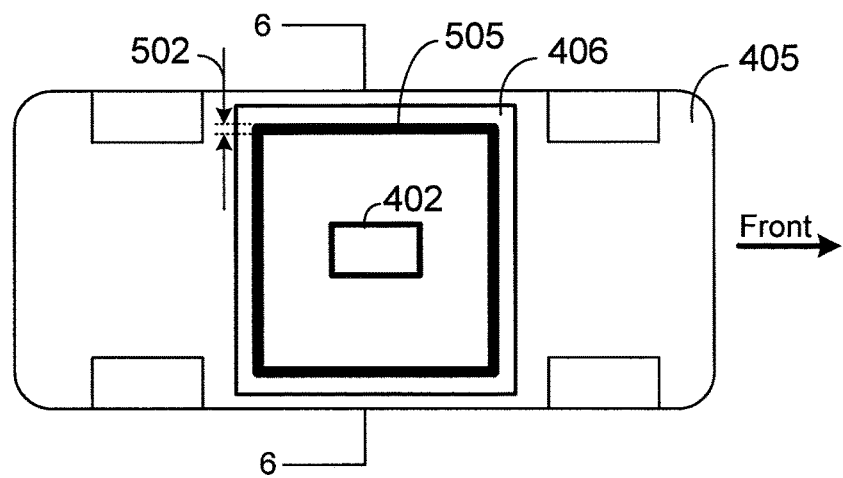
FIG. 5A-FIG. 5I are illustrations of the bottom of an electric vehicle fitted with a leakage field collector in accordance with an implementation.

FIG. 5A is an illustration of the bottom of an electric vehicle fitted with a leakage field collector in accordance with an implementation. FIG. 5A depicts the vehicle 405 comprising a rectangular leakage field collector 505. The collector 505 may have a uniform thickness around its perimeter. The collector 505 may further surround the housing 402 in the substantially horizontal plane, leaving a large central aperture through which wireless field such as the wireless field 216, can flow. In an implementation, the collector 505 may have a generally rectangular shape and dimensions slightly smaller than the vehicle shield 402.

Figure 5B:
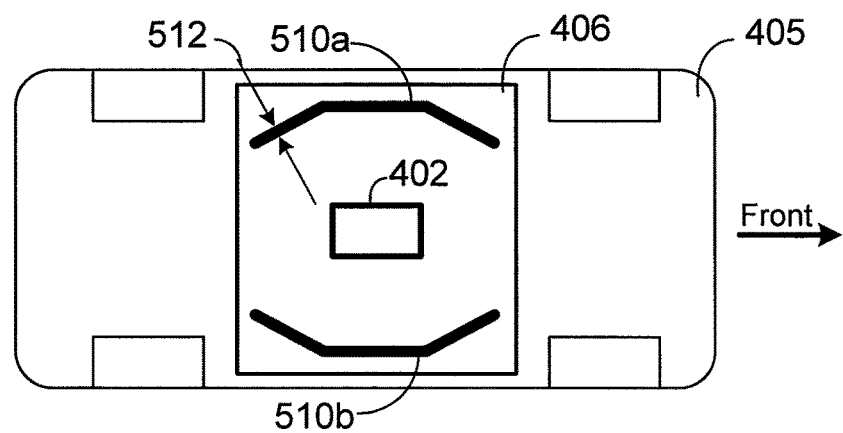

FIG. 5B is an illustration of the bottom of an electric vehicle fitted with leakage field collectors in accordance with an implementation. FIG. 5B depicts a pair of leakage collectors 510a and 510b disposed on the bottom of the electric vehicle 405. The collectors 510a and 510b are positioned within the area shielded by the vehicle shield 406. In an implementation, the leakage collectors 510a, 510b may each comprise two separate angled segments disposed on opposite sides of the vehicle 405. The collectors 510a, 510b may further substantially surround the housing 402. As shown, each of the collectors 510a, 510b each may have three portions. The center portion of each of the collectors 510a, 510b may be generally parallel with the longitudinal axis of the vehicle 405. The other two segments of each of the collectors 510 are angled toward the housing 502 and a crude "C" shape. In an implementation, the collectors 510a, 510b may have a width 512 along their length. In another implementation, the width 512 may not be constant along the entire length of the collectors 510.

Figure 5C:
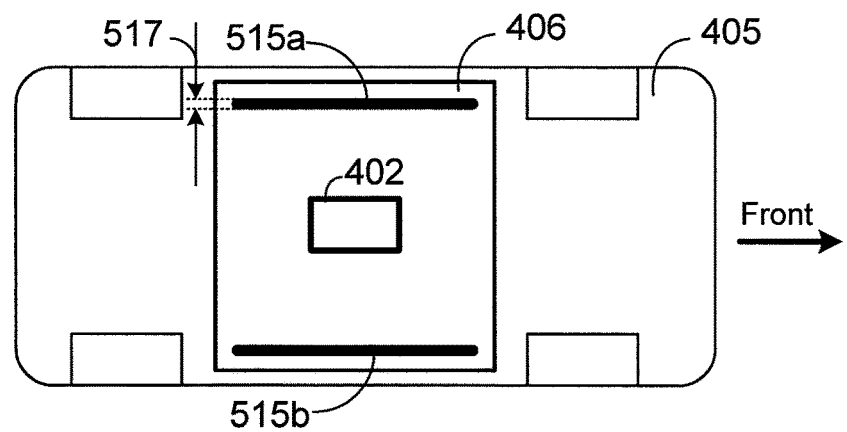

FIG. 5C is an illustration of the bottom of an electric vehicle fitted with leakage field collectors in accordance with an implementation. FIG. 5C depicts a pair of leakage collectors 515a and 515b. The leakage collectors 515a, 515b may comprise two parallel lengths disposed on the underside of the vehicle 405. The collectors 515a, 515b may be positioned on opposing sides of the housing 402 within the area shielded by the vehicle shield 406. The collectors 515a, 515b may further have a width 517, similar to the previous implementations. The width 517 as shown is constant along the length of the collectors 515, but may be varied along the length of the collectors 515a, 515b as required. In an embodiment, the leakage collectors 515a, 515b may also be positioned at the front and back (not shown) of the housing 402, as required.

Figure 5D:
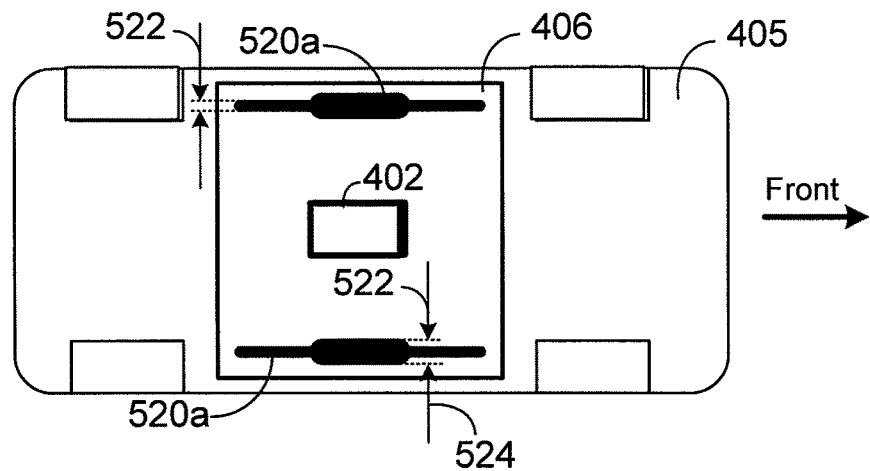

FIG. 5D is an illustration of the bottom of an electric vehicle fitted with leakage field collectors in accordance with an implementation. FIG. 5D depicts a pair of leakage field collectors 520a, 520b disposed on the bottom of the vehicle 405. The leakage collectors 520a, 520b may comprise two parallel lengths disposed on the underside of the sides of the vehicle 405. The collectors 520a, 520b may be positioned on opposite sides of the housing 402, substantially within the area shielded by the vehicle shield 406. The collectors 520a, 520b may be configured with a width that varies from a first width 522 to a second width 524. In another implementation, the first width 522 may be narrower than the second width 524. As shown, the collectors 520a, 520b may vary in width from the first width 522 at opposite ends to a wider second width 525 at the middle. In a third implementation, the opposite configuration may be present, having a narrow width at the middle and a wider width at the ends (not shown).

Figure 5E:
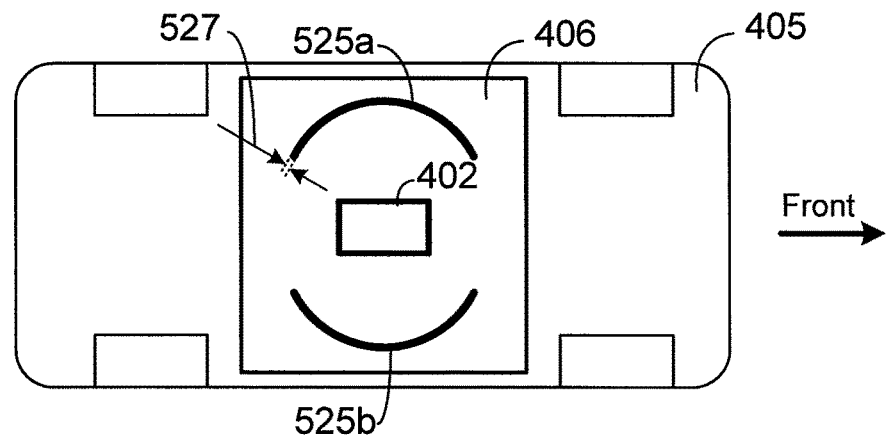

FIG. 5E is an illustration of the bottom of an electric vehicle fitted with leakage field collectors in accordance with an implementation. FIG. 5E depicts a pair of leakage field collectors 525a, 525b disposed on the bottom of the vehicle 405. The collectors 525a, 525b may comprise a number of curved, C-shaped portions disposed on the sides of the underside of the vehicle 405. As shown, the collectors 525a, 525b may have a width 527 along the entire length. In another implementation, the width 527 may also vary as needed along the length, similar to FIG. 5D. The C-shaped collectors 525 may flank either side of the housing 402 as shown or be disposed in another geometry around the housing 402 as needed for optimum leakage field absorption.

Figure 5F:
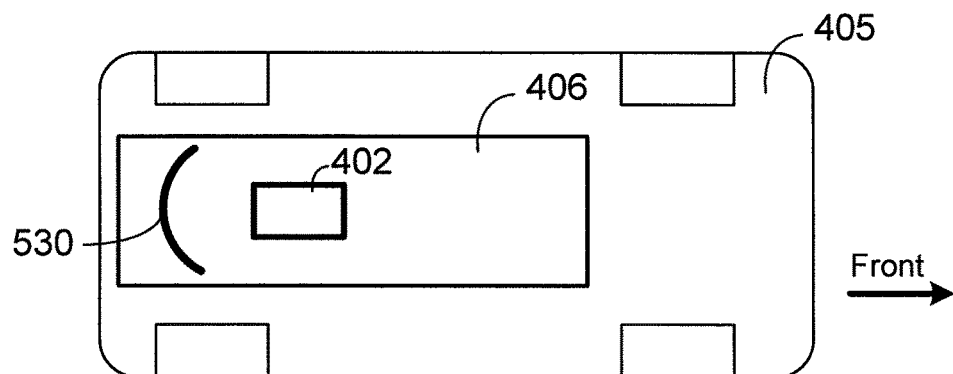

FIG. 5F is an illustration of the bottom of an electric vehicle fitted with a leakage field collector in accordance with an implementation. FIG. 5F depicts a leakage field collector 530 disposed on the bottom of the vehicle 405. The collector 530 may comprise at least one curved, C-shaped portion of ferromagnetic material. The collector 530 may be disposed on the underside of the rear of the vehicle 406, adjacent to the housing 402. In some implementations, the collector 530 may be disposed between the housing 402 and an area where a person may stand, such as the rear of the vehicle 405 as shown. In an implementation, the housing may also be disposed on the front of the vehicle 406 (not shown). Such an implementation may be incorporated where the housing 402 is positioned at the front of the vehicle 405.

Accordingly, the collector 530 may be positioned in to most efficiently influence or absorb leakage field 212 from the housing 402.

Figure 5G:
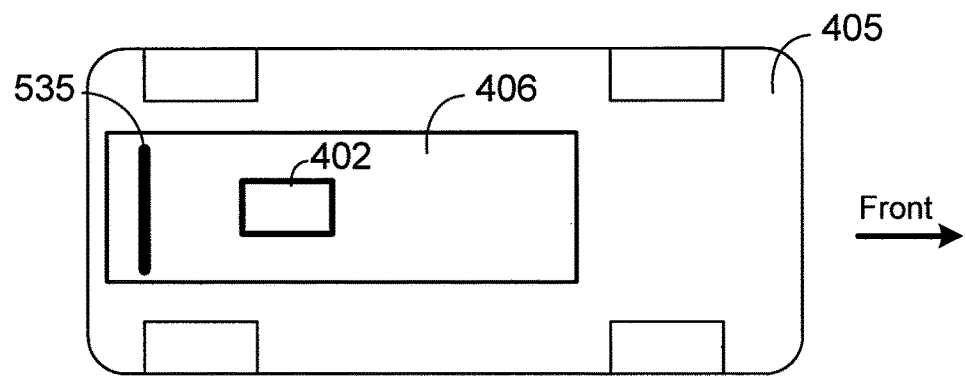

FIG. 5G is an illustration of the bottom of an electric vehicle fitted with a leakage field collector in accordance with an implementation. FIG. 5G depicts a leakage field collector 535 disposed on the underside of the rear of the vehicle 405. The collector 535 is positioned similar to collector 530 of FIG. 5F. The collector 535 may comprise at least one segment or a bar as shown. The collector 535 may have a uniform thickness along its length as in previous implementations; however a varying thickness may be selected to absorb a desired portion of the leakage field 212. The collector 535 is shown at the rear of the vehicle 405 in proximity to the housing 402. In an implementation, the collector 535 may also be disposed under the front of the vehicle to effectively influence or absorb leakage field 212 from the housing 402. This configuration may be desirable when the housing 402 is positioned at the front of the vehicle 405 (not show in this figure).

Figure 5H:
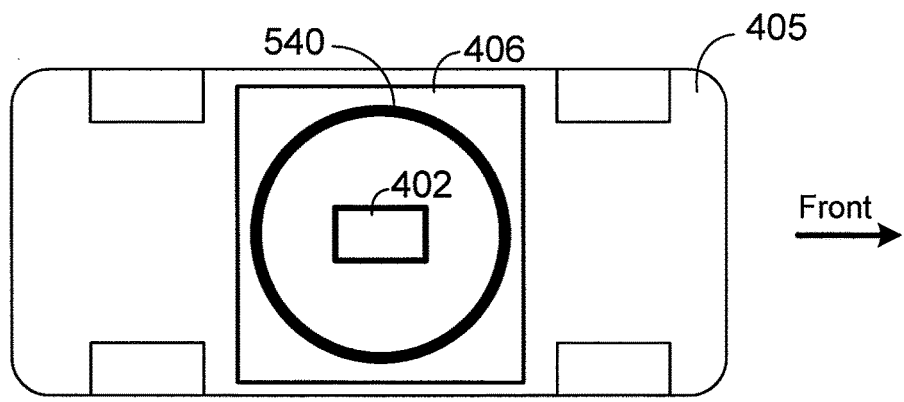

FIG. 5H is an illustration of the bottom of an electric vehicle fitted with a leakage field collector in accordance with an implementation. FIG. 5H depicts a continuous leakage field collector 540 disposed on the underside of the vehicle 405. The collector 540 is configured to surround the housing 402. The collector 540 may have a substantially uniform thickness along its length. However, in some implementations, the width of the collector 540 may vary as required (not shown in this figure). In some implementations the collector 540 may further be segmented, similar to the collector 530 (FIG. 5E) or as shown below in FIG. 5I. As in previous implementations, the collector 540 may have smaller dimensions than the vehicle shield 406.

Figure 5I:
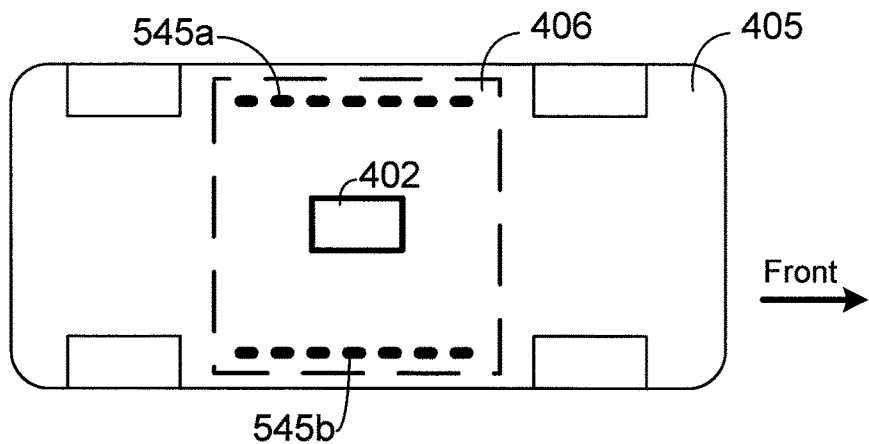

FIG. 5I is an illustration of the bottom of an electric vehicle fitted with a leakage field collector in accordance with an implementation. FIG. 5I depicts leakage field collectors 545a and 545b disposed on the underside of the rear of the vehicle 405. Such a configuration may be similar to FIG. 5F. The leakage collectors 545a, 545b may comprise multiple segmented sections along the underside of each side of the vehicle 405. As shown, two segmented collectors 545a, 545b are positioned on either side of the housing 402. While only two collectors 545a, 545b are show, additional implementations may provide additional collectors. In another implementation, the collectors 545 may be disposed within the area of the vehicle shield 406, redirecting or absorbing the leakage fields 212 emanating from the sides of the vehicle 405.

FIG. 6A-FIG. 6D depict internal views along a bottom portion of an electric vehicle, according to certain implementations. As shown, only the bottom portion of an electric vehicle chassis is present. Other components of the electric vehicle, such as wheels and other accessories are omitted from FIG. 6A-FIG. 6D figure for simplicity.

Figure 6A:
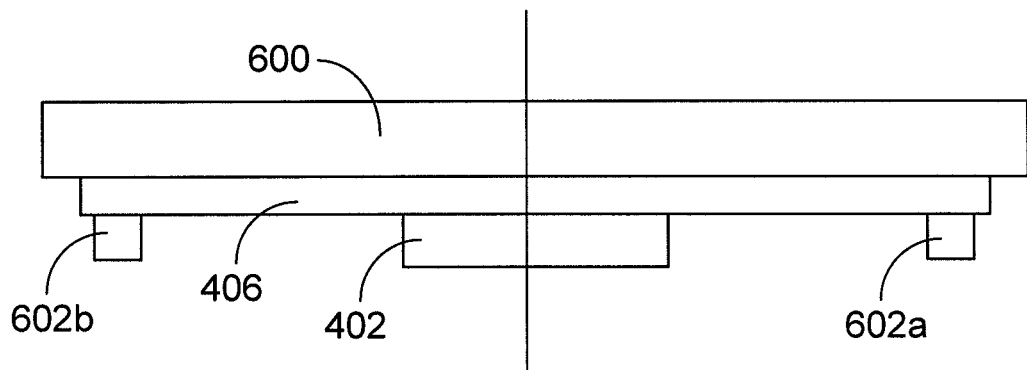
FIG. 6A is an internal view along a bottom portion of an electric vehicle according to an implementation.

FIG. 6A is an internal view along a bottom portion of an electric vehicle according to an implementation. As shown, FIG. 6A is depicts an internal view of a chassis 600 taken along the line 6-6 of FIG. 5A. The chassis 600 may be the bottom portion of the vehicle 405 (FIG. 4). The chassis may further comprise the vehicle shield 406 disposed on or otherwise mounted to the bottom of the chassis 600. As noted above in connection with FIG. 4, the vehicle shield 406 may comprise structural portions of the chassis 600. Accordingly, the vehicle shield 406 may not be a separate component, but may be formed as a portion of the chassis 600. Thus, for purposes of this description, the vehicle shield 406 is detailed as a separate component for clarity and completeness.

The chassis 600 may further comprise the housing 402 positioned on the bottom of the vehicle shield 406, similar to previous embodiments (e.g., FIG. 4-FIG. 5I). The chassis 600 may further comprise at least leakage collectors 602a and 602b, similar to the leakage collectors previously described in FIG. 4-FIG. 5I.

In one implementation, the leakage collectors 602a, 602b may be cross sectional views of individual segments of a leakage collector (e.g., the leakage collectors 510a, 510b, 520a, 520b, 525a, 525b, 545a, 545b etc.). In another implementation, the leakage collectors 620a, 620b may be a cross sectional view of a continuous leakage collector (e.g., the leakage collectors 505, 540, etc.). Accordingly, the leakage collectors 602a, 602b may depict the shape of any of the leakage collectors described herein.

The collectors 602 are disposed on the outer portion of the bottom of the vehicle in an area shielded by the vehicle shield 406. The collectors 602 may be mounted to, beside, or on the vehicle shield 406 according to a given design. The collectors 602 of FIG. 6A have a rectangular cross section. In an implementation, the rectangular cross section of the collectors 602 may be integrated into one of the collector geometries of FIG. 5A-FIG. 5I. The same is true for the following examples.

Figure 6B:
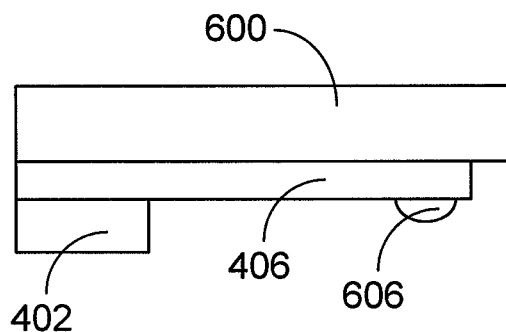
FIG. 6B is an internal view of a right hand side of the bottom portion of the electric vehicle of FIG. 6A, according to an implementation.
Figure 6C:
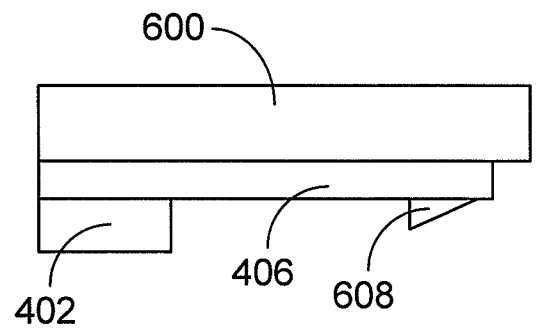
FIG. 6C is an internal view of a right hand side of the bottom portion of the electric vehicle of FIG. 6A, according to an implementation.
Figure 6D:
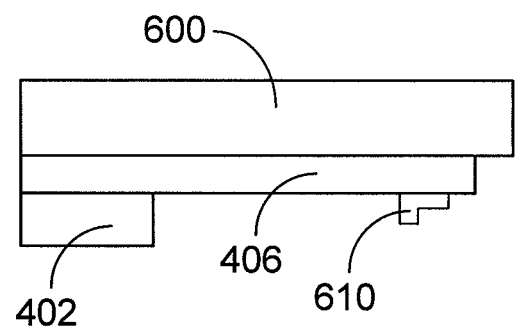
FIG. 6D is an internal view of a right hand side of the bottom portion of the electric vehicle of FIG. 6A, according to an implementation.

FIG. 6B is an internal view of a right hand side of the bottom portion of the electric vehicle of FIG. 6A, according to an implementation. FIG. 6B shows a cross along the bottom of the vehicle 405 taken along the line 6-6 of FIG. 5A. FIG. 6B-FIG. 6D show only one side of the internal view for simplicity. In an implementation, a leakage field collector 606 having a rounded or semicircular cross section may be disposed on the bottom of the chassis 600 in proximity to the housing 402. As in previous implementations, the collectors 606 may be disposed on a portion of the chassis 600 (or the vehicle 405) covered by the vehicle shield 406.

FIG. 6C is an internal view of a right hand side of the bottom portion of the electric vehicle of FIG. 6A, according to an implementation. FIG. 6C shows a cross along the bottom of the vehicle 405 taken along the line 6-6 of FIG. 5A. In an implementation, a leakage field collector 606 having a triangular cross section may be disposed on the bottom of the chassis 600 in proximity to the housing 402. As in previous implementations, the collectors 608 may be disposed on a portion of the chassis 600 (or the vehicle 405) covered by the vehicle shield 406.

FIG. 6D is an internal view of a right hand side of the bottom portion of the electric vehicle of FIG. 6A, according to an implementation. FIG. 6D shows a cross along the bottom of the vehicle 405 taken along the line 6-6 of FIG. 5A. In an implementation, a leakage field collector 610 having an irregular, rectangular, or composite cross section may be disposed on the bottom of the chassis 600 in proximity to the housing 402. The collector 610 is depicted having an L-shaped cross section.

FIG. 6A-FIG. 6D depict various cross sectional dimensions and shapes for the leakage field collectors as disclosed herein. It is to be noted that geometry, position, and layout the planar views of the leakage collectors 505, 510, 515, 520, 525, 530, 535, 540, 545 may be combined in part or in whole with the various cross sections of collectors 602, 604, 608, 610. Certain implementations may include multiple types and geometries of the field collectors disclosed herein.

It should further be noted that implementations described above are not drawn to scale, thus any specific dimensions are not limiting.

Figure 7A:
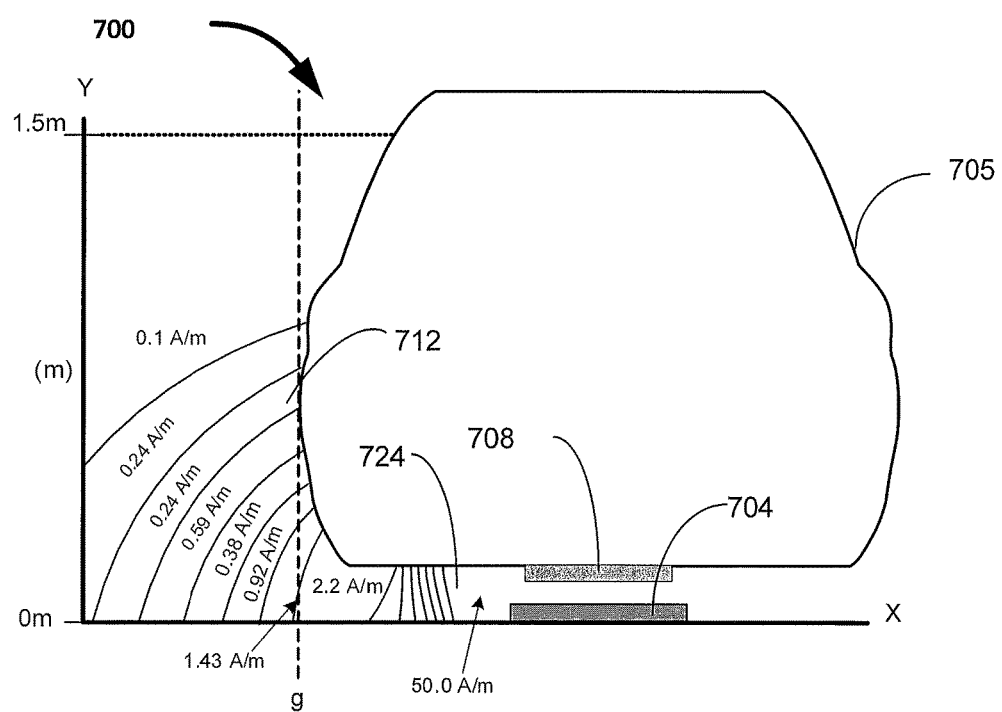
FIG. 7A depicts a magnetic field intensity diagram, according to an implementation.
Figure 7B:
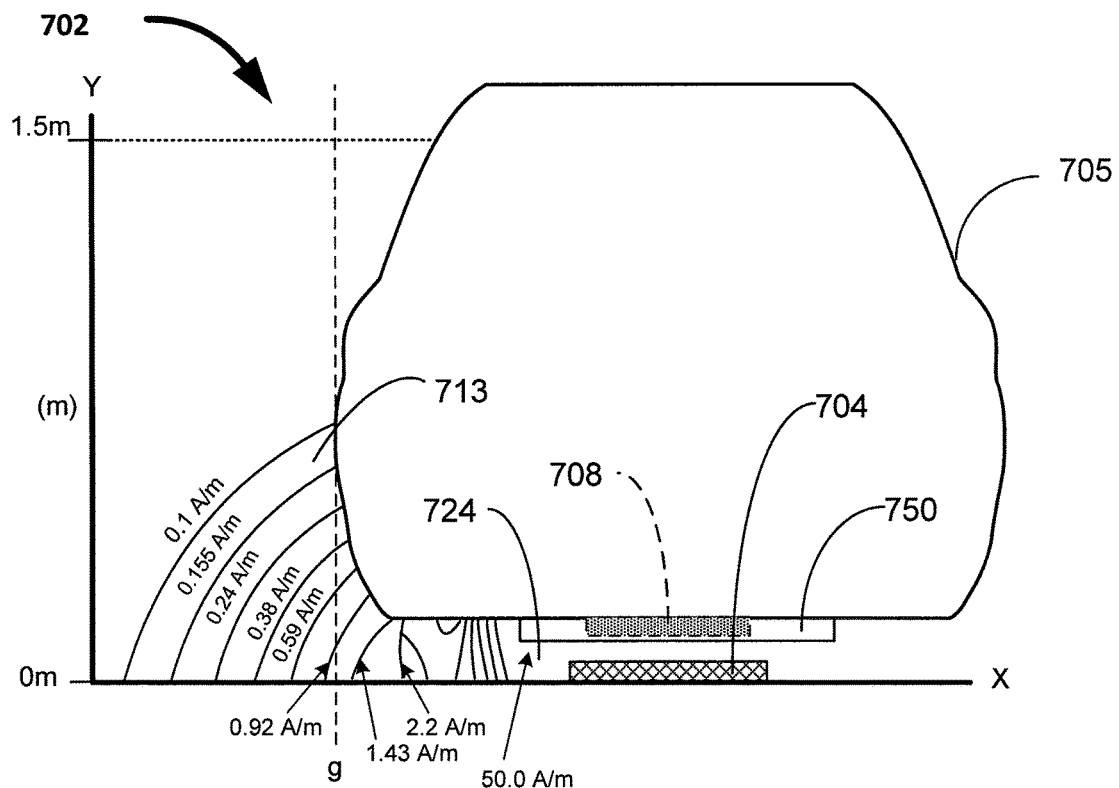
FIG. 7B depicts a magnetic field intensity diagram, according to another implementation.

Additionally, the implementation of various shapes, cross sections, and dimensions of collectors 350 (FIG. 3), 450 (FIG. 4), and those disclosed in FIG. 5A-FIG. 5I, may have differing effects on the reduction of the leakage fields, further explained with respect to FIG. 7A-FIG. 7B. It should also be noted that the cross section of the collectors 350 may impact the leakage field 212a, 212b field distribution. The collectors 350 may have varying or irregular cross sections (see above, FIG. 6A-FIG. 6D) which may also affect the overall volume of the collectors 350. Accordingly, the cross section of the collectors 350 may be selected to optimally adjust the absorption or influence on the leakage field 212.

FIG. 7A depicts a magnetic field intensity diagram, according to an implementation. As shown, FIG. 7A, illustrates a field intensity diagram 700, showing a series of magnetic flux lines depicted in a two-dimensional space relative to a magnetic field source depicted as a transmitter 704. As shown, each line of magnetic flux represents an equal magnitude of a leakage field 712 in Amperes per meter (A/m) emanating from the transmitter 704. Each of the vertical (Y) and horizontal axes (X) represents a distance from the transmitter 704. The vertical axis depicts a height from the ground (0 m) up to 1.5 m from the ground, indicated by a mark on the vertical axis and dotted line. The horizontal axis (X) is also shown in meters, however the horizontal axis indicates an arbitrary distance and is not critical to this description. The 1.5 m mark and a line "g" (shown as a dashed line) are used as references for the following figures, FIG. 7B and FIG. 7C, as described below.

As shown, the transmitter 704 is positioned on the bottom of a vehicle 705. The vehicle 705 is depicted as an outline of an electric vehicle (e.g., the vehicle 105). Accordingly, diagram 700 is representative of the electric vehicle 705 as it is receiving wireless power from the transmitter 704.

In some implementations the electric vehicle 705, substantially similar to the vehicle 405 (FIG. 4), comprises a wireless power receiver 708, substantially similar to the wireless power receive 208 (FIG. 2). The vehicle 705 is shown positioned over the WEVC transmitter 704 (similar to the transmitter 204 of FIG. 2) in a charging state, receiving wireless power. The series of magnetic flux lines comprised a leakage field 712, similar to the leakage field 212. The leakage field 712 is being generated by the transmitter 704 and flowing away from the vehicle 705.

In general, magnetic fields (e.g., leakage field 212, 712) may decrease in intensity with distance; that is, the farther from the source, the weaker field becomes. This is shown in the diagram 700. As shown, the leakage field 712 begins at a magnitude of 50.0 A/m, in a space 724, closest to the transmitter 704. The leakage field lines are shown having increasing radius and decreasing magnitude with increased distance from the transmitter 704 (and the vehicle 705) in the vertical and horizontal axes, to 0.1 A/m at the outer most line of magnetic flux. Various exemplary values are shown in the field depicting the decreasing magnitude of the leakage magnetic field 712.

FIG. 7B depicts a magnetic field intensity diagram, according to another implementation. FIG. 7B illustrates a field intensity diagram 702 showing a series of magnetic flux lines depicted in a two-dimensional space relative to the transmitter 704. The diagram 702 is substantially similar to the diagram 700 (FIG. 7A) depicting magnetic field intensity as a function of distance from the vehicle 705. Similar to FIG. 7A, each line of magnetic flux represents an equal magnitude of the leakage field 713 in A/m emanating from the transmitter 704. As in FIG. 7A, the 1.5 m line is also shown here, coincident with the line "g" near the top of the vehicle 705.

The diagram 702 further depicts the vehicle 705 having a leakage field collector 750 disposed on the underside of the vehicle 705 in proximity to the receiver 708. The leakage field collector 750 may be one of the previously described leakage collectors in FIG. 4-FIG. 6D. The receiver 708 is shown in dashed lines indicating its position within the leakage collector 750.

FIG. 7B further shows various values of the magnitude of the leakage field as noted by the numbers adjacent to the flux lines of the leakage field 713. The field 713 is shown having a maximum magnitude of 50.0 A/m in the space 724 closest to the transmitter 704. The magnitude of the leakage field 713 decreases with distance in the vertical and horizontal axes, down to a value of 0.1 A/m, similar to FIG. 7A. However, it should be noted that the intensity of leakage field 713 decreases faster with distance than the leakage field 712, due to the presence of the leakage collector 750.

Figure 7C:
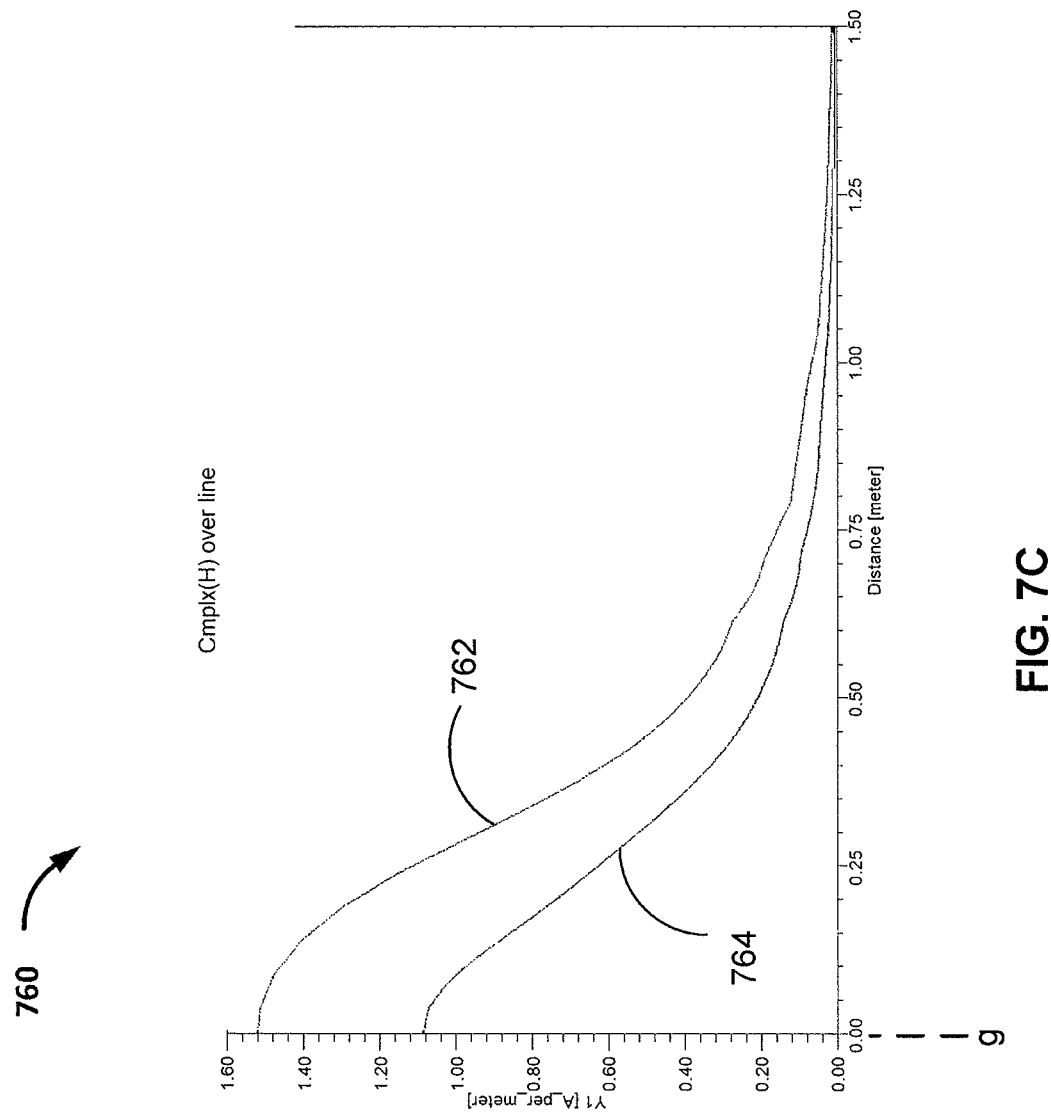
FIG. 7C shows a plot diagram illustrating a comparison of the attenuation of the magnitude of the leakage fields of FIG. 7A and FIG. 7B as a function of distance.

FIG. 7C shows a plot diagram illustrating a comparison of the attenuation of the magnitude of the leakage fields of FIG. 7A and FIG. 7B as a function of distance. As shown, a chart 760 depicts the relative intensities of the leakage field 712 and the leakage field 713 as a function of the distance in meters.

The chart 760 has a vertical (Y) axis depicting a field intensity measured in A/m. The measurements of the leakage field 712, 713 intensity comprising the chart 760 are taken from a position relative to the vehicle 705, common to both diagrams 700, 702, along the line "g." The line "g" is positioned at an outer edge of the vehicle 705 of FIG. 7A and FIG. 7B. Accordingly, the line "g" is also present in this figure, coincident with the vertical axis of the chart 760. The line "g" is further representative of a position adjacent to the side of the vehicle 705 where a person might stand.

The chart 760 further comprises a horizontal (X) axis depicting a distance from the source (e.g., the transmitter 704) in meters (m). The distance shown on the horizontal axis of the chart 760 is measured from zero (0) m on the ground (of FIG. 7A and FIG. 7B), vertically along the line "g," to a measurement of 1.5 m high, corresponding the 1.5 m mark of FIG. 7A and FIG. 7. Specifically, origin of the horizontal (X) axis of the chart 760 represents the measurement of the intensity of the fields 712, 713 (FIG. 7A and FIG. 7B) taken at a point on the line "g" closest to the transmitter 704 at the ground.

As shown, the chart 760 depicts a line 762 corresponding to the diagram 700. The line 762 begins at approximately 1.46 A/m and attenuates with distance from the line "g," asymptotically approaching zero. The chart 760 further depicts a line 764 corresponding to the diagram 702. The line 764 begins on the left at a value of approximately 1.08 A/m and attenuates with distance from the transmitter 704, asymptotically approaching zero at 1.5 m. It is to be appreciated that the line 764 starts at a value less than that of the line 762 and furthermore, attenuates more rapidly than the line 762, approaching zero at a distance closer to the vehicle 705. This reduction of initial starting value (e.g., 1.46 A/m versus 1.08 A/m) and more rapid attenuation of the leakage fields with distance may be due to the selected position, geometry, and composition of the leakage collector 750.

Figure 8:
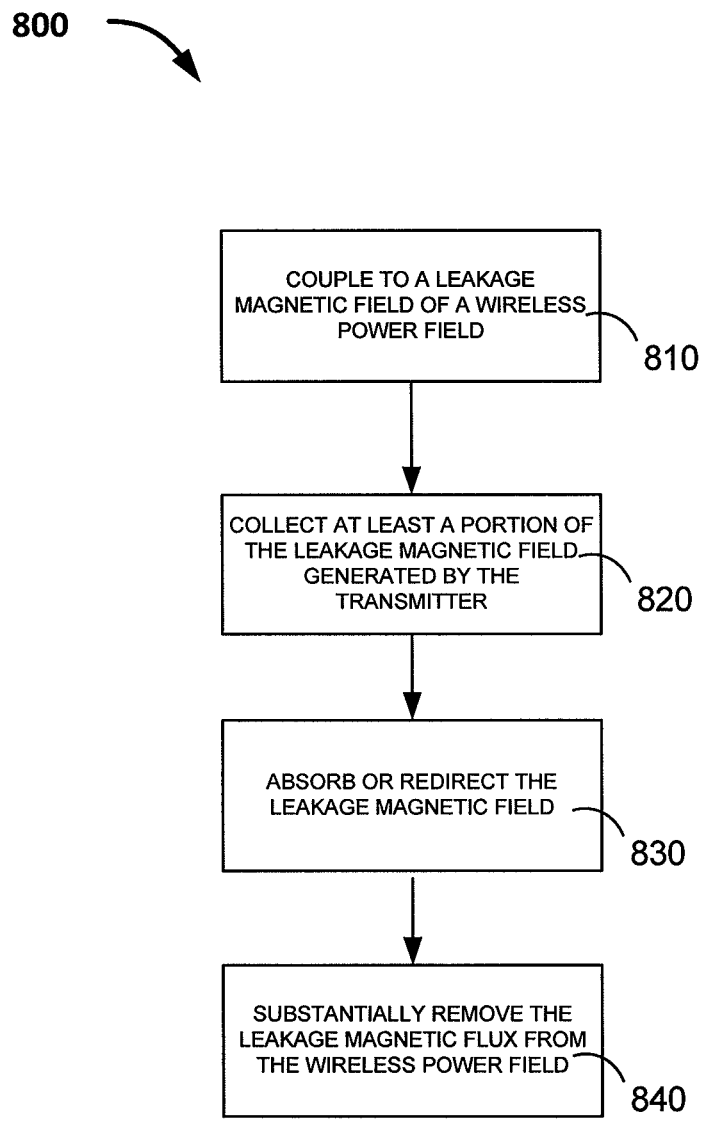
FIG. 8 is a flowchart depicting a method according to an implementation

FIG. 8 is a flowchart depicting a method according to an implementation. As shown, FIG. 8 depicts a method 800 describing the process by which a leakage field (e.g., the leakage field 212, 712) is absorbed or redirected by one or more leakage collectors (e.g., the collector 350, 750, etc.) as described in connection with the foregoing figures.

At block 810, a leakage collector (e.g., the collector 350) may couple to a leakage magnetic field (e.g., the leakage field 212) of a wireless field (e.g., the wireless field 216) generated by a wireless power transmitter (e.g., the transmitter 204).

At block 820, the leakage collector 350 may collect at least a portion of the leakage magnetic field (e.g. leakage magnetic flux) generated by the transmitter. As described above in connection with FIG. 4-FIG. 7C, the composition, geometry, and position of the leakage collector 350 may be selected to effectively absorb or redirect the leakage flux at block 830.

At block 840 the collector 350 may substantially remove the leakage flux from the wireless power field. In summary, block 840 describes the net effect of process of a leakage collector 350 on the leakage field 212. Block 840 further describes the process shown by the FIG. 7C and the reduction of leakage flux at the line "g."

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk, and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages, and novel features of certain implementations have been described herein. It is to be understood that not necessarily all such advantages may be achieved in accordance with any particular implementation. Thus, the implementations may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for collecting leakage magnetic flux of a wireless field in a wireless power transfer system, comprising:
    a wireless power receiver configured to couple to a wireless field generated by a wireless power transmitter, wherein a portion of the wireless field comprises the leakage magnetic flux; and
    a leakage collector comprising a ferromagnetic material having a predetermined geometry and composition and configured to absorb or redirect at least a portion of the leakage magnetic flux away from an outer edge of an electric vehicle, wherein the leakage collector is positioned at a first distance from the wireless power receiver within the wireless field and wherein a width of the leakage collector varies from a first width to a second width, and wherein the first width is narrower than the second width.

2. The apparatus of claim 1, wherein the leakage collector is disposed on a bottom portion of the electric vehicle at approximately an outer edge of the electric vehicle, and wherein the leakage collector at least partially surrounds the wireless power receiver in a substantially horizontal plane.

3. The apparatus of claim 1, further comprising a magnetic vehicle shield disposed on a bottom portion of the electric vehicle, wherein the wireless power receiver and the leakage collector are positioned below the magnetic vehicle shield.

4. The apparatus of claim 1, wherein the leakage collector is disposed on a bottom portion of the electric vehicle and completely surrounds the wireless power receiver.

5. The apparatus of claim 1, wherein the leakage collector has a perimeter greater than a perimeter of the wireless power receiver, and wherein the leakage collector has a relative magnetic permeability value sufficient to absorb or redirect the leakage magnetic flux.

6. The apparatus of claim 5, wherein the relative magnetic permeability is greater than $\mu_r=10$.

7. The apparatus of claim 1, wherein the leakage collector is shaped in one of a square, a rectangle, a circle, a triangle, a polygon, or a semicircle, and wherein a perimeter of the leakage collector extends away from a bottom of the electric vehicle below the wireless power receiver.

8. The apparatus of claim 1, wherein the ferromagnetic material has a magnetic permeability value sufficient to absorb or redirect the leakage magnetic flux.

9. The apparatus of claim 8, wherein the ferromagnetic material comprises one of a soft magnetic composite, a nanocrystalline magnetic material, or a plastic bonded ferrite powder.

10. The apparatus of claim 1, wherein the leakage collector has a cross section configured to influence the leakage field, the cross section having dimensions that extend orthogonally away from the bottom of the vehicle.

11. The apparatus of claim 1, wherein the first distance is equal to at least one half of a distance between the wireless power receiver and the outer edge of the electric vehicle.

12. A method for collecting leakage magnetic flux of a wireless field in a wireless power transfer system, comprising:
coupling, via a wireless power receiver, to the wireless field generated by a wireless power transmitter, wherein a portion of the wireless field comprises the leakage magnetic flux; and
absorbing or redirecting at least a portion of the leakage magnetic flux away from an outer edge of an electric vehicle via a leakage collector, the leakage collector comprising a ferromagnetic material having a predetermined geometry and composition and positioned at a first distance from a wireless power receiver within the wireless field, wherein a width of the leakage collector varies from a first width to a second width, and wherein the first width is narrower than the second width.

13. The method of claim 12, further comprising substantially removing the leakage flux from the wireless power field using the leakage collector.

14. The method of claim 12, wherein the leakage collector is disposed on a bottom portion of the electric vehicle at approximately an outer edge of the electric vehicle, and wherein the leakage collector at least partially surrounds the wireless power receiver in a substantially horizontal plane.

15. The method of claim 12, wherein a magnetic vehicle shield is disposed on a bottom portion of the electric vehicle, wherein the wireless power receiver and the leakage collector are positioned below the magnetic vehicle shield.

16. The method of claim 12, wherein the leakage collector is disposed on a bottom portion of the electric vehicle and completely surrounds the wireless power receiver.

17. The method of claim 12, wherein the leakage collector has a perimeter greater than a perimeter of the wireless power receiver, and wherein the leakage collector has a relative magnetic permeability value sufficient to absorb or redirect the leakage magnetic flux.

18. The method of claim 17, wherein the relative magnetic permeability is greater than $\mu_r=10$.

19. The method of claim 12, wherein the leakage collector is shaped in one of a square, a rectangle, a circle, a triangle, a polygon, or a semicircle, and wherein a perimeter of the leakage collector extends away from a bottom of the electric vehicle below the wireless power receiver.

20. The method of claim 12, wherein the ferromagnetic material has a magnetic permeability value sufficient to absorb or redirect the leakage magnetic flux.

21. The method of claim 20, wherein the ferromagnetic material comprises one of a soft magnetic composite, a nanocrystalline magnetic material, and a plastic bonded ferrite powder.

22. An apparatus for collecting leakage magnetic flux of a wireless field in a wireless power transfer system, comprising:
means for coupling to a wireless field generated by a wireless power transmitter, wherein a portion of the wireless field comprises the leakage magnetic flux; and
means for absorbing or redirecting at least a portion of the leakage magnetic flux away from an outer edge of an electric vehicle, the pair of absorbing means having a predetermined geometry and composition, wherein a width of the absorbing means varies from a first width to a second width, and wherein the first width is narrower than the second width.

23. The apparatus of claim 22, wherein the coupling means comprises a wireless power receiver, and wherein the means for absorbing or redirecting at least a portion of the leakage magnetic flux comprises a leakage collector comprising a ferromagnetic material and positioned at a first distance from the wireless power receiver within the wireless field.

24. The apparatus of claim 22, wherein the means for absorbing or redirecting at least a portion of the leakage magnetic flux is disposed on a bottom portion of the electric vehicle at approximately an outer edge of the electric vehicle, and wherein the means for absorbing or redirecting at least a portion of the leakage magnetic flux at least partially surrounds the coupling means in a substantially horizontal plane.

25. The apparatus of claim 22, further comprising a magnetic vehicle shield disposed on a bottom portion of the electric vehicle, wherein the coupling means and the means for absorbing or redirecting at least a portion of the leakage magnetic flux are positioned below the magnetic vehicle shield.

26. The apparatus of claim 22, wherein the means for absorbing or redirecting at least a portion of the leakage magnetic flux is disposed on a bottom portion of the electric vehicle and completely surrounds the coupling means.

27. The apparatus of claim 22, wherein the means for absorbing or redirecting at least a portion of the leakage magnetic flux has a perimeter greater than a perimeter of the coupling means, and wherein the means for absorbing or redirecting at least a portion of the leakage magnetic flux has a relative magnetic permeability value sufficient to absorb or redirect the leakage magnetic flux.

28. The apparatus of claim 27, wherein the relative magnetic permeability is greater than $\mu_r=10$.

29. The apparatus of claim 22, wherein the means for absorbing or redirecting at least a portion of the leakage magnetic flux is shaped in one of a square, a rectangle, a circle, a triangle, a polygon, or a semicircle, and wherein a perimeter of the means for absorbing or redirecting at least a portion of the leakage magnetic flux extends away from a bottom of the electric vehicle below the coupling means.

30. The apparatus of claim 22, wherein the means for absorbing or redirecting at least a portion of the leakage magnetic flux has a magnetic permeability value sufficient to absorb or redirect the leakage magnetic flux.

31. The apparatus of claim 1, wherein the leakage collector has opposite ends equal to the first width and a center equal to the second width.

32. The apparatus of claim 1, wherein the leakage collector has opposite ends equal to the first width and a center equal to the second width.

33. The apparatus of claim 1, further comprising another leakage collector having a width that varies from the first width to the second width and wherein the leakage collector and the other leakage collector are disposed along opposite sides of the wireless power receiver.

34. The method of claim 12, wherein the leakage collector has opposite ends equal to the first width and a center equal to the second width.

35. The method of claim 12, wherein the leakage collector has opposite ends equal to the second width and a center equal to the first width.

36. The method of claim 12, further comprising another leakage collector having a width that varies from the first width to the second width and wherein the leakage collector and the other leakage collector are disposed along opposite sides of the wireless power receiver.

37. The apparatus of claim 22, wherein the means for absorbing or redirecting at least a portion of the leakage magnetic flux has opposite ends equal to the first width and a center equal to the second width.

38. The apparatus of claim 22, wherein the means for absorbing or redirecting at least a portion of the leakage magnetic flux has opposite ends equal to the second width and a center equal to the first width.

39. The apparatus of claim 22, further comprising another means for absorbing or redirecting at least a portion of the leakage magnetic flux having a width that varies from the first width to the second width and wherein the means for absorbing or redirecting at least a portion of the leakage magnetic flux and the other means for absorbing or redirecting at least a portion of the leakage magnetic flux are disposed along opposite sides of the means for coupling to a wireless field.

* * * * *